United States Patent
Suzuki et al.

(10) Patent No.: US 8,944,956 B2
(45) Date of Patent: Feb. 3, 2015

(54) CONTINUOUSLY VARIABLE TRANSMISSION AND CONTROL METHOD THEREOF

(71) Applicant: JATCO Ltd, Fuji-shi, Shizuoka (JP)

(72) Inventors: Hideaki Suzuki, Yokohama (JP); Ryousuke Nonomura, Kawasaki (JP); Hiroyasu Tanaka, Atsugi (JP); Takuichiro Inoue, Fujisawa (JP); Mamiko Inoue, Machida (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/078,218

(22) Filed: Nov. 12, 2013

(65) Prior Publication Data
US 2014/0073469 A1 Mar. 13, 2014

Related U.S. Application Data

(63) Continuation of application No. 12/558,139, filed on Sep. 11, 2009, now abandoned.

(30) Foreign Application Priority Data

Sep. 25, 2008 (JP) ................. 2008-245752

(51) Int. Cl.
*B60W 10/04* (2006.01)
*F16H 37/02* (2006.01)
*F16H 61/04* (2006.01)
(Continued)

(52) U.S. Cl.
CPC .......... *F16H 37/021* (2013.01); *F16H 61/0437* (2013.01); *F16H 61/66259* (2013.01); *F16H 2037/023* (2013.01); *F16H 2037/025* (2013.01); *F16H 2061/6614* (2013.01)
USPC .............................................. 477/41; 477/37

(58) Field of Classification Search
USPC ........................................................ 477/37, 41
See application file for complete search history.

(56) References Cited

U.S. PATENT DOCUMENTS 4,672,863 A * 6/1987 Itoh et al. ......................... 477/41
6,855,085 B1 * 2/2005 Gumpoltsberger ........... 475/211
7,217,217 B2 * 5/2007 Santelli ........................ 475/230
(Continued)

FOREIGN PATENT DOCUMENTS

DE 199 41 009 A1 3/2001
DE 199 50 053 A1 4/2001
(Continued)

OTHER PUBLICATIONS

U.S. Appl. No. 12/558,212, filed Sep. 11, 2009, Suzuki et al.
(Continued)

*Primary Examiner* — Derek D Knight
(74) *Attorney, Agent, or Firm* — Foley & Lardner LLP (57) ABSTRACT

When a through speed ratio, which is an overall speed ratio of a variator and a subtransmission mechanism, varies from a larger speed ratio than a mode switch speed ratio to a smaller speed ratio than the mode switch speed ratio, a gear position of the subtransmission mechanism is changed from a first gear position to a second gear position. The mode switch speed ratio is set at a through speed ratio obtained when the speed ratio of the variator is a Highest speed ratio and the gear position of the subtransmission mechanism is the first gear position.

15 Claims, 7 Drawing Sheets

(51) Int. Cl.
  *F16H 61/662* (2006.01)
  *F16H 61/66* (2006.01)

(56) References Cited

U.S. PATENT DOCUMENTS

| | | |
|---|---|---|
| 8,142,330 B2 | 3/2012 | Suzuki et al. |
| 8,241,178 B2 | 8/2012 | Jozaki et al. |
| 8,277,362 B2 | 10/2012 | Nonomura et al. |
| 8,280,597 B2 | 10/2012 | Takahashi et al. |
| 8,298,119 B2 | 10/2012 | Jozaki et al. |
| 8,323,141 B2 | 12/2012 | Jozaki et al. |
| 2007/0123385 A1 | 5/2007 | Shimazu et al. |
| 2009/0082172 A1 | 3/2009 | Mori et al. |
| 2010/0075799 A1 | 3/2010 | Suzuki et al. |
| 2010/0075800 A1 | 3/2010 | Suzuki et al. |
| 2010/0075801 A1 | 3/2010 | Suzuki et al. |
| 2010/0222971 A1 | 9/2010 | Takahashi et al. |
| 2010/0227736 A1 | 9/2010 | Takahashi et al. |
| 2010/0228449 A1 | 9/2010 | Takahashi et al. |
| 2010/0228450 A1 | 9/2010 | Takahashi et al. |
| 2010/0228454 A1 | 9/2010 | Takahashi et al. |
| 2010/0248875 A1 | 9/2010 | Jozaki et al. |
| 2010/0248886 A1 | 9/2010 | Jozaki et al. |
| 2010/0248894 A1 | 9/2010 | Jozaki et al. |
| 2010/0248895 A1 | 9/2010 | Jozaki et al. |
| 2011/0015033 A1 | 1/2011 | Nonomura et al. |
| 2011/0015834 A1 | 1/2011 | Nonomura et al. |
| 2011/0015835 A1 | 1/2011 | Takahashi et al. |
| 2011/0015836 A1 | 1/2011 | Takahashi et al. |
| 2011/0015837 A1 | 1/2011 | Takahashi et al. |
| 2011/0015838 A1 | 1/2011 | Takahashi et al. |
| 2011/0015839 A1 | 1/2011 | Takahashi et al. |
| 2011/0015840 A1 | 1/2011 | Takahashi et al. |
| 2011/0053718 A1 | 3/2011 | Nonomura et al. |
| 2012/0059556 A1 | 3/2012 | Tanaka et al. |
| 2012/0059557 A1 | 3/2012 | Tanaka et al. |
| 2012/0059558 A1 | 3/2012 | Tanaka et al. |
| 2012/0059559 A1 | 3/2012 | Tanaka et al. |
| 2012/0083977 A1 | 4/2012 | Tanaka et al. |
| 2012/0143448 A1 | 6/2012 | Tohyama et al. |
| 2012/0244993 A1 | 9/2012 | Ishida et al. |

FOREIGN PATENT DOCUMENTS

| | | |
|---|---|---|
| JP | 60-037455 A | 2/1985 |
| JP | 61-103049 A | 5/1986 |
| JP | 61-241561 A | 10/1986 |
| JP | 62-137239 A | 6/1987 |
| JP | 63-266265 A | 11/1988 |
| JP | 03-204443 A | 9/1991 |
| JP | 05-079554 A | 3/1993 |
| JP | 2006-161955 A | 6/2006 |

OTHER PUBLICATIONS

U.S. Appl. No. 12/558,231, filed Sep. 11, 2009, Suzuki et al.
U.S. PTO Notice of Allowance, U.S. Appl. No. 12/558,212, dated Nov. 23, 2011, 13 pages.
U.S. PTO Office Action, U.S. Appl. No. 12/558,231, dated May 7, 2012, 11 pages.

* cited by examiner

CONTINUOUSLY VARIABLE TRANSMISSION AND CONTROL METHOD THEREOF

CROSS-REFERENCE TO RELATED APPLICATIONS

This application is a continuation of U.S. patent application Ser. No. 12/558,139, filed Sep. 11, 2009, which claims priority from Japanese Patent Application No. 2008-245752, filed on Sep. 25, 2008. The entire contents of these applications are incorporated herein by reference in their entirety.

FIELD OF THE INVENTION

This invention relates to a continuously variable transmission having a continuously variable transmission mechanism and a subtransmission mechanism.

BACKGROUND OF THE INVENTION

A belt type continuously variable transmission (to be referred to as a "CVT" hereafter) comprises a pair of pulleys having a variable groove width and a belt wrapped around the pulleys, and is capable of varying a speed ratio continuously by modifying the respective groove widths of the pulleys. In a vehicle installed with a CVT, an engine can be used in a more efficient operating condition than in a vehicle having a conventional stepped transmission, and therefore improvements in a power performance and a fuel consumption performance of the vehicle can be expected.

To improve the power performance and fuel consumption performance of a vehicle installed with a CVT further, a speed ratio range (to be referred to as a "ratio range" hereafter) of the CVT is preferably enlarged. By enlarging the ratio range of the CVT, speed ratios on a large speed ratio side can be used during startup and acceleration, thereby further improving the power performance of the vehicle, and speed ratios on a small speed ratio side can be used during high-speed travel, thereby further improving the fuel consumption performance of the vehicle.

To enlarge the ratio range of the CVT, a pulley diameter may be increased, but with this method, the CVT increases in size and weight, which is undesirable.

Therefore, in JP60-37455A and JP61-241561A, a two-forward speed subtransmission mechanism is provided in series with the CVT to the front or rear thereof, and by changing a gear position of the subtransmission mechanism in accordance with the operating conditions of the vehicle, a wide ratio range is realized without increasing the size of the CVT.

SUMMARY OF THE INVENTION

In the above-described transmission combining a CVT and a subtransmission mechanism, a problem arises with respect to the conditions under which the gear position of the subtransmission mechanism is changed.

On this point, in JP60-37455A, the gear position of the subtransmission mechanism is changed on the basis of a vehicle speed and a throttle opening in accordance with a predetermined shift pattern. Further, in JP61-241561A, the gear position of the subtransmission mechanism is changed when a condition for alleviating shift shock in the subtransmission mechanism is established.

According to the condition for changing the gear position of the subtransmission mechanism described in JP61-241561A, shift shock can be reduced in the subtransmission mechanism. However, in JP61-241561A, the gear position of the subtransmission mechanism is not changed when the vehicle speed is low or the throttle opening is large, and therefore change of the gear position of the subtransmission mechanism is limited excessively, meaning that it may be impossible to achieve the original object of providing the subtransmission mechanism, i.e. improving the power performance and fuel consumption performance, sufficiently.

An object of this invention is to suppress shift shock in a subtransmission mechanism while maintaining favorable power performance and fuel consumption performance.

According to an aspect of the present invention, a continuously variable transmission installed in a vehicle is provided. The transmission comprises a continuously variable transmission mechanism (to be referred to as hereafter as a "variator") which modifies a speed ratio continuously, a subtransmission mechanism provided to the rear of and in series with the variator and including, as forward gear positions, a first gear position and a second gear position having a smaller speed ratio than the first gear position; and a shift control unit which modifies a through speed ratio, which is an overall speed ratio of the variator and the subtransmission mechanism, by modifying the speed ratio of the variator and changing the gear position of the subtransmission mechanism on a basis of an operating condition of the vehicle.

The through speed ratio when the speed ratio of the variator is a Highest speed ratio and the gear position of the subtransmission mechanism is the first gear position is set as a mode switch speed ratio. When the through speed ratio varies from a larger speed ratio than the mode switch speed ratio to a smaller speed ratio than the mode switch speed ratio, the shift control unit changes the gear position of the subtransmission mechanism from the first gear position to the second gear position.

According to another aspect of the present invention, a control method for a continuously variable transmission installed in a vehicle and including a continuously variable transmission mechanism (to be referred to as hereafter as a "variator") which modifies a speed ratio continuously and a subtransmission mechanism provided to the rear of and in series with the variator and including, as forward gear positions, a first gear position and a second gear position having a smaller speed ratio than the first gear position, is provided. The control method comprises a shift control step for modifying a through speed ratio, which is an overall speed ratio of the variator and the subtransmission mechanism, by modifying the speed ratio of the variator and changing the gear position of the subtransmission mechanism on a basis of an operating condition of the vehicle.

The through speed ratio when the speed ratio of the variator is a Highest speed ratio and the gear position of the subtransmission mechanism is the first gear position is set as a mode switch speed ratio. When the through speed ratio varies from a larger speed ratio than the mode switch speed ratio to a smaller speed ratio than the mode switch speed ratio, the shift control step changes the gear position of the subtransmission mechanism from the first gear position to the second gear position.

According to these aspects of the invention, the gear position of the subtransmission mechanism is changed from the first gear position to the second gear position when the speed ratio of the variator is the Highest speed ratio. When the speed ratio of the variator is the Highest speed ratio, torque input into the subtransmission mechanism via the variator is at a minimum under the torque that is input into the variator at the time, and therefore shift shock in the subtransmission mechanism can be suppressed effectively.

Further, when the through speed ratio varies across the mode switch speed ratio, the gear position of the subtransmission mechanism is changed, and therefore change of the gear position of the subtransmission mechanism is not limited excessively. As a result, the favorable operating performance and fuel consumption performance that are obtained by providing the subtransmission mechanism can be enjoyed.

Embodiments and advantages of this invention will be described in detail below with reference to the attached figures.

DESCRIPTION OF THE PREFERRED EMBODIMENTS

An embodiment of this invention will be described below with reference to the attached drawings. It should be noted that in the following description, a "speed ratio" of a certain transmission mechanism is a value obtained by dividing an input rotation speed of the transmission mechanism by an output rotation speed of the transmission mechanism. Further, a "Lowest speed ratio" denotes a maximum speed ratio of the transmission mechanism, and a "Highest speed ratio" denotes a minimum speed ratio of the transmission mechanism.

Figure 1:
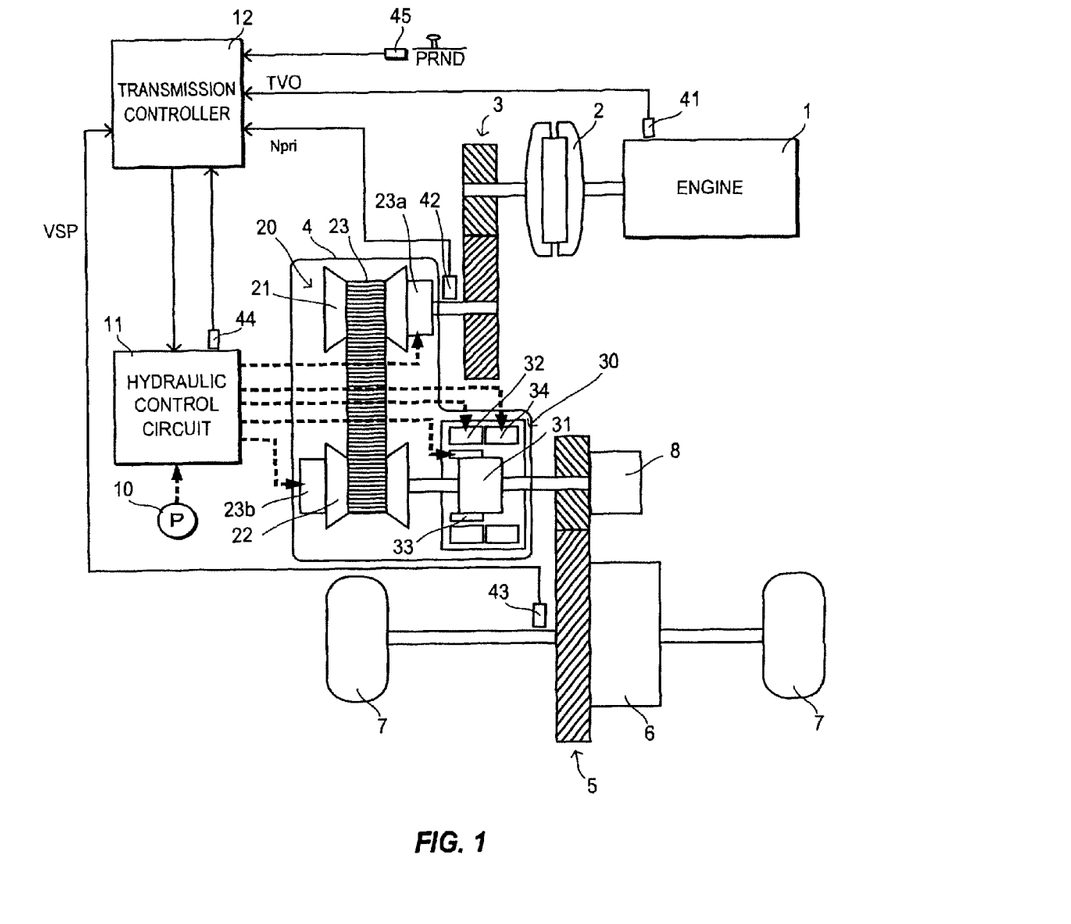
FIG. 1 is a schematic constitutional diagram of a vehicle installed with a continuously variable transmission according to an embodiment of this invention.

FIG. 1 is a schematic constitutional diagram of a vehicle installed with a continuously variable transmission according to an embodiment of this invention. The vehicle has an engine 1 as a power source. Output rotation of the engine 1 is transmitted to a drive wheel 7 via a torque converter having a lockup clutch 2, a first gear train 3, a continuously variable transmission (to be referred to simply as a "transmission 4" hereafter), a second gear train 5, and a final reduction gear 6. The second gear train 5 is provided with a parking mechanism 8 which locks an output shaft of the transmission 4 mechanically so that the output shaft is incapable of rotation during parking.

The vehicle is further provided with an oil pump 10 which is driven using a part of the power of the engine 1, a hydraulic control circuit 11 which regulates an oil pressure from the oil pump 10 and supplies the regulated oil pressure to various sites of the transmission 4, and a transmission controller 12 which controls the hydraulic control circuit 11.

To describe the respective constitutions, the transmission 4 includes a belt type continuously variable transmission mechanism (to be referred to as a "variator 20" hereafter), and a subtransmission mechanism 30 provided to the rear of and in series with the variator 20. The term "provided to the rear of" means that the subtransmission mechanism 30 is provided further toward the drive wheel 7 side than the variator 20 on a power transmission path extending from the engine 1 to the drive wheel 7. Further, the term "provided in series" means that the variator 20 and the subtransmission mechanism 30 are provided in series on this power transmission path. The subtransmission mechanism 30 may be directly connected to an output shaft of the variator 20, as in this example, or via another transmission mechanism or power transmission mechanism (for example, a gear train).

The variator 20 includes a primary pulley 21, a secondary pulley 22, and a V belt 23 wrapped around the pulleys 21, 22. The pulleys 21, 22 respectively include a fixed conical plate, a movable conical plate that is disposed relative to the fixed conical plate such that respective sheave surfaces thereof oppose each other and forms a V groove with the fixed conical plate, and a hydraulic cylinder 23a, 23b that is provided on a back surface of the movable conical plate and displaces the movable conical plate in an axial direction. When an oil pressure supplied to the hydraulic cylinder 23a, 23b is varied, the width of the V groove varies, leading to variation in a contact radius between the V belt 23 and the pulley 21, 22, and as a result, a speed ratio vRatio of the variator 20 varies continuously.

The subtransmission mechanism 30 is a two-forward speed, one-reverse speed transmission mechanism. The subtransmission mechanism 30 includes a Ravigneaux planetary gear mechanism 31 coupling the carriers of two planetary gears, and a plurality of frictional engagement elements (a Low brake 32, a High clutch 33, and a Rev brake 34) connected to a plurality of rotary elements constituting the Ravigneaux planetary gear mechanism 31 to modify the rotation states thereof. The gear position of the subtransmission mechanism 30 is changed by adjusting the oil pressure supplied to the respective frictional engagement elements 32 to 34 such that the engagement/disengagement states of the respective frictional engagement elements 32 to 34 are modified. For example, by engaging the Low brake 32 and disengaging the High clutch 33 and Rev brake 34, the gear position of the subtransmission mechanism 30 is set in a first speed. By engaging the High clutch 33 and disengaging the Low brake 32 and Rev brake 34, the gear position of the subtransmission mechanism 30 is set in a second speed having a smaller speed ratio than the first speed. By engaging the Rev brake 34 and disengaging the Low brake 32 and the High clutch 33, the gear position of the subtransmission mechanism 30 is set in reverse. It should be noted that in the following description, a state in which the gear position of the subtransmission mechanism 30 is in the first speed will be expressed as "the transmission 4 is in a low speed mode", and a state in which the gear position of the subtransmission mechanism 30 is in the second speed will be expressed as "the transmission 4 is in a high speed mode".

Figure 2:
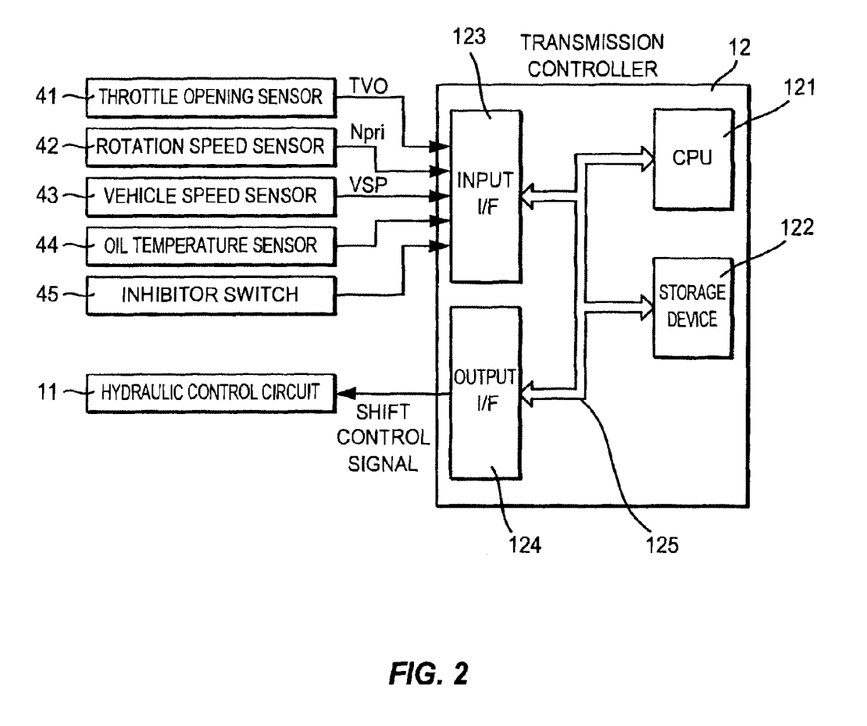
FIG. 2 is a view showing the interior constitution of a transmission controller.

As shown in FIG. 2, the transmission controller 12 is constituted by a CPU 121, a storage device 122 including a RAM and a ROM, an input interface 123, an output interface 124, and a bus 125 connecting these components to each other.

An output signal from a throttle opening sensor 41 that detects an opening of a throttle valve of the engine 1 (to be referred to as a "throttle opening TVO" hereafter), an output signal from a rotation speed sensor 42 that detects an input rotation speed of the transmission 4 (=the rotation speed of the primary pulley 21, to be referred to hereafter as a "primary rotation speed Npri"), an output signal from a vehicle speed sensor 43 that detects a traveling speed of the vehicle (to be referred to hereafter as a "vehicle speed VSP"), an output signal from an oil temperature sensor 44 that detects an oil temperature of the transmission 4, an output signal from an inhibitor switch 45 that detects a position of a select lever, and so on are input into the input interface 123.

The storage device 122 stores a shift control program for the transmission 4 and a shift map (FIG. 4) used by the shift control program. The CPU 121 reads and executes the shift control program stored in the storage device 122, generates a shift control signal by implementing various types of calculation processing on the various signals input via the input interface 123, and outputs the generated shift control signal to the hydraulic control circuit 11 via the output interface 124. Various values used in the calculation processing executed by the CPU 121 and calculation results thereof are stored in the storage device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, and prepares a required oil pressure from the oil pressure generated by the oil pump 10, which is then supplied to various sites of the transmission 4. As a result, the speed ratio vRatio of the variator 20 is modified and the gear position of the subtransmission mechanism 30 is changed, whereby a shift is performed in the transmission 4.

Figure 3:
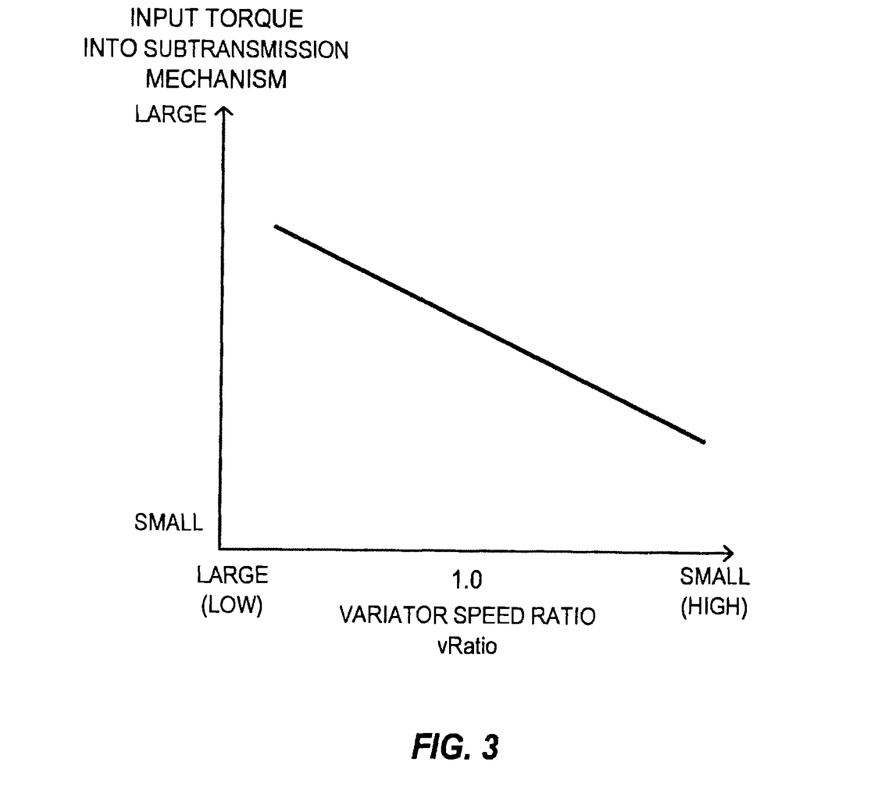
FIG. 3 is a view showing an example of a relationship between a speed ratio of a variator and an input torque input into a subtransmission mechanism.

FIG. 3 is a table showing an example of a relationship between the speed ratio vRatio of the variator 20 and input torque input into the subtransmission mechanism 30 when the speed ratio vRatio of the variator 20 is varied, on the condition that an input torque input into the variator 20 is constant. As shown in the figure, the input torque input into the subtransmission mechanism 30 decreases as the speed ratio vRatio of the variator 20 shifts further to the small speed ratio side, and reaches a minimum when the speed ratio vRatio of the variator 20 corresponds to the Highest speed ratio. This means that by changing the gear position of the subtransmission mechanism 30 when the speed ratio vRatio of the variator 20 is the Highest speed ratio, shift shock in the subtransmission mechanism 30 is suppressed.

Hence, the transmission controller 12 shifts the gear position of the subtransmission mechanism 30 from the first speed to the second speed when the speed ratio of the variator 20 is the Highest speed ratio. The specific content of this shift control will be described below.

Figure 4:
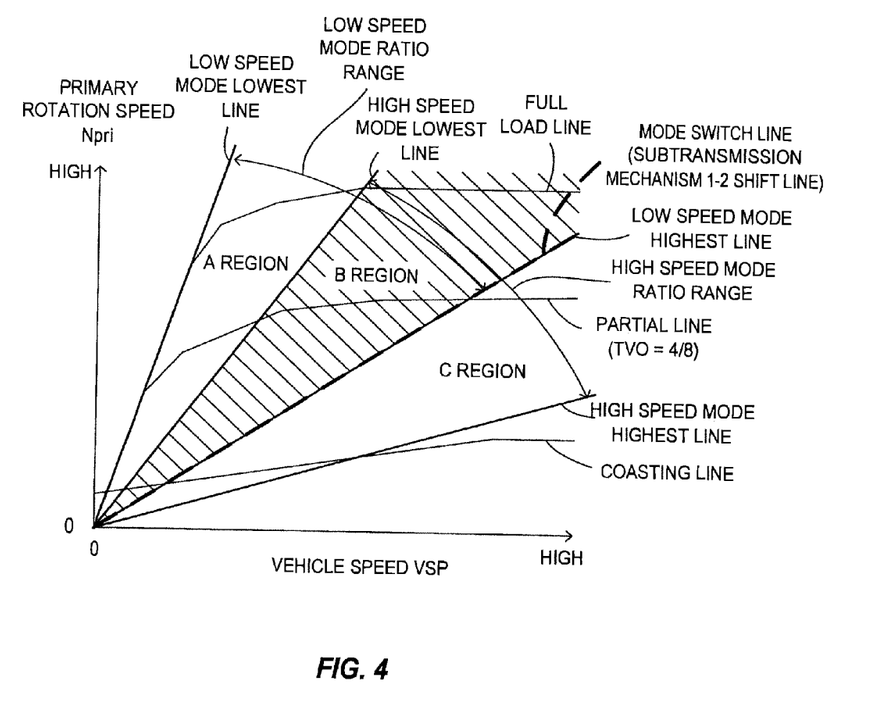
FIG. 4 is a view showing an example of a shift map of the transmission.

FIG. 4 shows an example of the shift map stored in the storage device 122 of the transmission controller 12.

On the shift map, an operating point of the transmission 4 is determined on the basis of the vehicle speed VSP and the primary rotation speed Npri. An incline of a line linking the operating point of the transmission 4 and a zero point in the lower left corner of the shift map indicates the speed ratio of the transmission 4 (an overall speed ratio obtained by multiplying the speed ratio of the subtransmission mechanism 30 with the speed ratio vRatio of the variator 20, to be referred to hereafter as a "through speed ratio Ratio"). On this shift map, similarly to a shift map of a conventional belt type continuously variable transmission, a shift line is set at each throttle opening TVO, and a shift is performed in the transmission 4 according to a shift line selected in accordance with the throttle opening TVO. For ease of understanding, FIG. 4 shows only a full load line (a shift line used when the throttle opening TVO=8/8), a partial line (a shift line used when the throttle opening TVO=4/8), and a coasting line (a shift line used when the throttle opening TVO=0).

When the transmission 4 is in the low speed mode, the transmission 4 can be shifted between a low speed mode Lowest line, which is obtained by maximizing the speed ratio vRatio of the variator 20, and a low speed mode Highest line, which is obtained by minimizing the speed ratio vRatio of the variator 20. In the low speed mode, the operating point of the transmission 4 moves within an A region and a B region. When the transmission 4 is in the high speed mode, the transmission 4 can be shifted between a high speed mode Lowest line, which is obtained by maximizing the speed ratio vRatio of the variator 20, and a high speed mode Highest line, which is obtained by minimizing the speed ratio vRatio of the variator 20. In the high speed mode, the operating point of the transmission 4 moves within the B region and a C region.

The speed ratios of the respective gear positions of the subtransmission mechanism 30 are set such that a speed ratio corresponding to the low speed mode Highest line (low speed mode Highest speed ratio) is smaller than a speed ratio corresponding to the high speed mode Lowest line (high speed mode Lowest speed ratio). In so doing, a low speed mode ratio range, which is the through speed ratio Ratio range of the transmission 4 in the low speed mode, and a high speed mode ratio range, which is the through speed ratio Ratio range of the transmission 4 in the high speed mode, partially overlap such that when the operating point of the transmission 4 is in the B region, which is sandwiched between the high speed mode Lowest line and the low speed mode Highest line, the transmission 4 can select either the low speed mode or the high speed mode.

Further, on the shift map, a mode switch line on which a shift is performed in the subtransmission mechanism 30 (a 1-2 shift line of the subtransmission mechanism 30) is set to overlap the low speed mode Highest line. A through speed ratio corresponding to the mode switch line (to be referred to hereafter as a "mode switch speed ratio mRatio") is set at an equal value to the low speed mode Highest speed ratio. When the operating point of the transmission 4 crosses the mode switch line, or in other words when the through speed ratio Ratio of the transmission 4 varies across the mode switch speed ratio mRatio, the transmission controller 12 performs mode switch control. In the mode switch control, the transmission controller 12 performs a shift in the subtransmission mechanism 30 and modifies the speed ratio vRatio of the variator 20 in an opposite direction to the variation direction of the speed ratio of the subtransmission mechanism 30.

More specifically, when the through speed ratio Ratio of the transmission 4 shifts from being larger than the mode switch speed ratio mRatio to being smaller than the mode switch speed ratio mRatio, the transmission controller 12 changes the gear position of the subtransmission mechanism 30 from the first speed to the second speed (subtransmission mechanism 1-2 shift) and modifies the speed ratio vRatio of the variator 20 to the large speed ratio side. Conversely, when the through speed ratio Ratio of the transmission 4 shifts from being smaller than the mode switch speed ratio mRatio to being larger than the mode switch speed ratio mRatio, the transmission controller 12 changes the gear position of the subtransmission mechanism 30 from the second speed to the first speed (subtransmission mechanism 2-1 shift) and modifies the speed ratio vRatio of the variator 20 to the small speed ratio side. During a mode switch, the speed ratio vRatio of the variator 20 is varied in an opposite direction to the speed ratio variation of the subtransmission mechanism 30 in order to suppress an unpleasant feeling experienced by a driver due to input rotation variation generated by a sudden change in the through speed ratio Ratio of the transmission 4.

Figure 5:
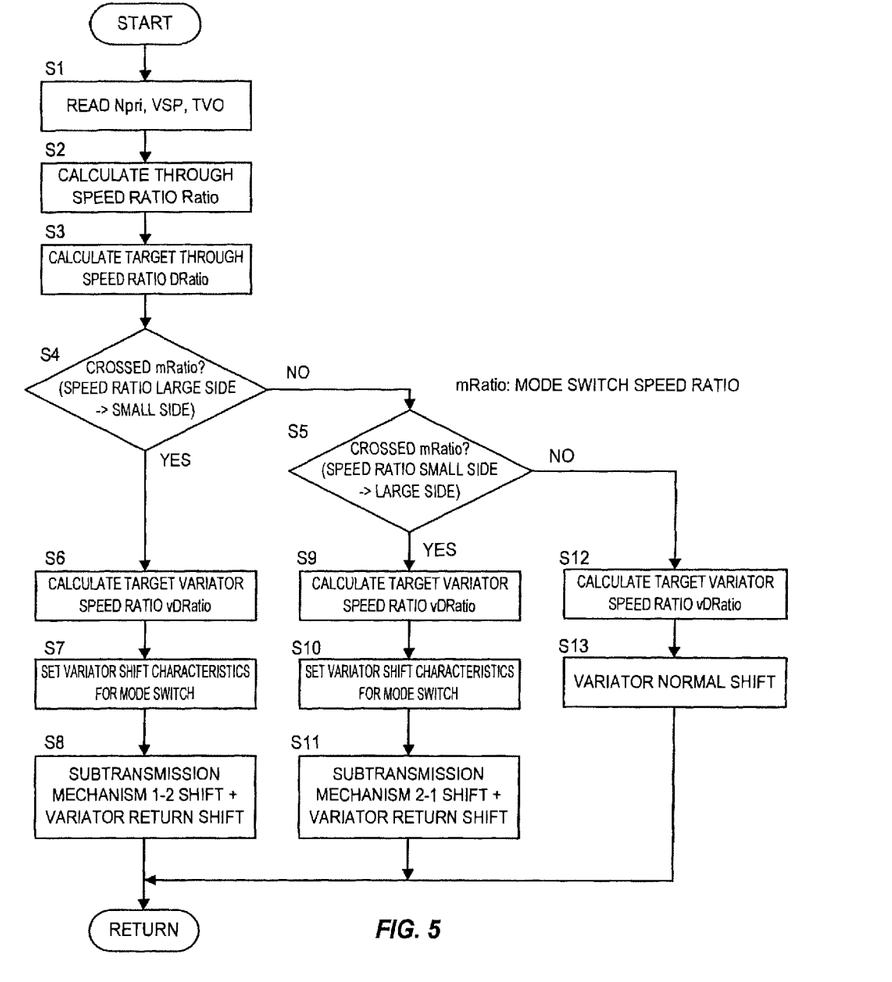
FIG. 5 is a flowchart showing the content of a shift control program executed by the transmission controller.

FIG. 5 shows an example of the shift control program stored in the storage device 122 of the transmission controller 12. The specific content of the shift control executed by the transmission controller 12 will now be described with reference to FIG. 5.

In a step S1, the transmission controller 12 reads the primary rotation speed Npri, vehicle speed VSP, and throttle opening TVO.

In a step S2, the transmission controller 12 calculates the through speed ratio Ratio (current value) of the transmission 4 on the basis of the primary rotation speed Npri, the vehicle speed VSP, and a reduction ratio fRatio of the final reduction gear 6.

In a step S3, the transmission controller 12 refers to the shift map (FIG. 4) stored in the storage device 122 on the basis of the primary rotation speed Npri and vehicle speed VSP to calculate a target through speed ratio DRatio (target value), or in other words the speed ratio to be attained by the transmission 4 next, on the basis of the current primary rotation speed Npri, vehicle speed VSP, and throttle opening TVO.

In steps S4 and S5, the transmission controller 12 determines whether or not the through speed ratio Ratio has crossed the mode switch speed ratio mRatio. This determination is made by comparing the through speed ratio Ratio and a previous value thereof (a value calculated in the step S2 during the previous execution of the processing shown in FIG. 5) with the mode switch speed ratio mRatio.

When the through speed ratio Ratio has crossed the mode switch speed ratio mRatio from the large speed ratio side to the small speed ratio side, the processing advances from the step S4 to a step S6, and when the through speed ratio Ratio has crossed the mode switch speed ratio mRatio from the small speed ratio side to the large speed ratio side, the processing advances from the step S5 to a step S9. Further, when the through speed ratio Ratio has not crossed the mode switch speed ratio mRatio, the processing advances from the step S5 to a step S12.

In steps S6 to S8, the transmission controller 12 changes the gear position of the subtransmission mechanism 30 from the first speed to the second speed and modifies the speed ratio vRatio of the variator 20 to the large speed ratio side (subtransmission mechanism 1-2 shift and variator return shift).

In the step S6, the transmission controller 12 calculates a target variator speed ratio vDRatio (target value), or in other words the speed ratio to be attained by the variator 20 following completion of the mode switch, on the basis of the target through speed ratio DRatio calculated in the step S3 and the second-speed speed ratio (post-shift speed ratio) of the subtransmission mechanism 30.

In the step S7, the transmission controller 12 sets shift characteristics (shift speed, increase/decrease tendency of shift speed, and so on) of the variator 20 during the mode switch on the basis of a target shift time t12 for a gear position shift in the subtransmission mechanism 30 from the first speed to the second speed and a deviation between the speed ratio vRatio (current value) and the target variator speed ratio vDRatio of the variator 20 such that when the shift in the subtransmission mechanism 30 is complete, the speed ratio vRatio of the variator 20 corresponds to the target variator speed ratio vDRatio. The target shift time t12 of the subtransmission mechanism 30 may take a fixed value or may be modified in accordance with the vehicle speed VSP, an engine torque, and an input torque input into the subtransmission mechanism 30. The speed ratio vRatio of the variator 20 is calculated on the basis of the through speed ratio Ratio calculated in the step S1 and the speed ratio of the current gear position (first speed) of the subtransmission mechanism 30.

In the step S8, the transmission controller 12 begins the 1-2 shift in the subtransmission mechanism 30 and the return shift in the variator 20. As a result, the gear position of the subtransmission mechanism 30 is changed from the first speed to the second speed and the speed ratio vRatio of the variator 20 is modified to the large speed ratio side. By shifting the variator 20 in accordance with the shift characteristics set in the step S7, the shift in the variator 20 is completed at substantially the same time as the shift in the subtransmission mechanism 30.

Meanwhile, in steps S9 to S11, the transmission controller 12 changes the gear position of the subtransmission mechanism 30 from the second speed to the first speed and modifies the speed ratio vRatio of the variator 20 to the small speed ratio side (subtransmission mechanism 2-1 shift and variator return shift).

In the step S9, the transmission controller 12 calculates the target variator speed ratio vDRatio (target value), or in other words the speed ratio to be attained by the variator 20 following completion of the mode switch, on the basis of the target through speed ratio DRatio calculated in the step S3 and the first-speed speed ratio (post-shift speed ratio) of the subtransmission mechanism 30.

In the step S10, the transmission controller 12 sets the shift characteristics (shift speed, increase/decrease tendency of shift speed, and so on) of the variator 20 during the mode switch on the basis of a target shift time t21 for a gear position shift in the subtransmission mechanism 30 from the second speed to the first speed and the deviation between the speed ratio vRatio (current value) and the target variator speed ratio vDRatio of the variator 20 such that when the shift in the subtransmission mechanism 30 is complete, the speed ratio vRatio of the variator 20 corresponds to the target variator speed ratio vDRatio. The target shift time t21 of the subtransmission mechanism 30 may take a fixed value or may be modified in accordance with the vehicle speed VSP, the engine torque, and the input torque input into the subtransmission mechanism 30. The speed ratio vRatio of the variator 20 is calculated on the basis of the through speed ratio Ratio calculated in the step S1 and the speed ratio of the current gear position (second speed) of the subtransmission mechanism 30.

In the step S11, the transmission controller 12 begins the 2-1 shift in the subtransmission mechanism 30 and the return shift in the variator 20. As a result, the gear position of the subtransmission mechanism 30 is changed from the second speed to the first speed and the speed ratio vRatio of the variator 20 is modified to the small speed ratio side. By shifting the variator 20 in accordance with the shift characteristics set in the step S10, the shift in the variator 20 is completed at substantially the same time as the shift in the subtransmission mechanism 30.

On the other hand, in steps S12 to S13, the transmission controller 12 performs a shift (normal shift) in the variator 20 alone without changing the gear position of the subtransmission mechanism 30.

In the step S12, the transmission controller 12 calculates the target variator speed ratio vDRatio (target value) on the basis of the target through speed ratio DRatio calculated in the step S3 and the speed ratio of the current gear position of the subtransmission mechanism 30.

In the step S13, the transmission controller 12 performs a shift in the variator 20 such that the speed ratio vRatio of the variator 20 (current value) varies to the target variator speed ratio vDRatio with a desired shift characteristic (for example, a first order lag response).

Next, actions and effects obtained by performing the above shift control will be described.

Figure 6:
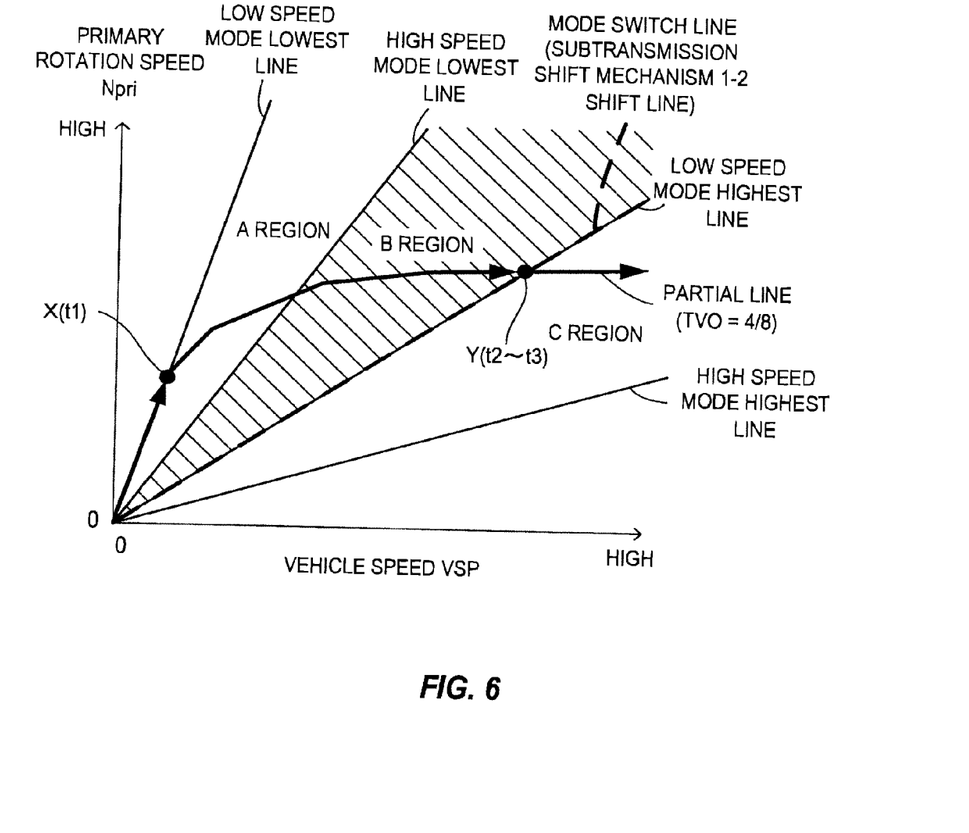
FIG. 6 is a view showing the manner in which an operating point of the transmission moves during vehicle acceleration.
Figure 7:
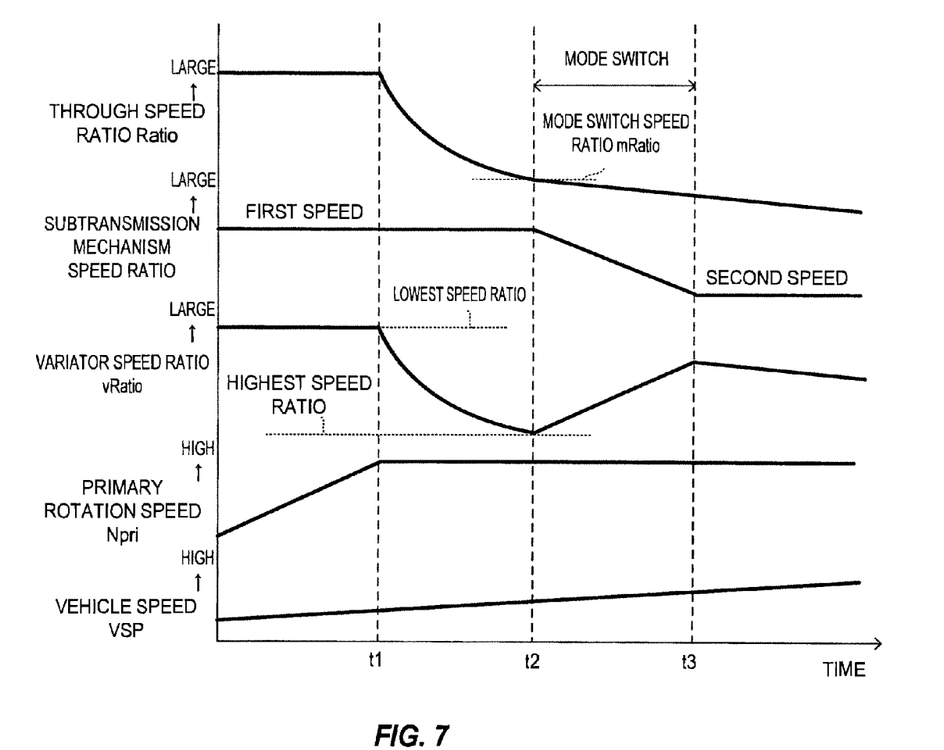
FIG. 7 is a timing chart showing the manner in which various parameters of the transmission vary during vehicle acceleration.

FIG. 6 is a view showing the manner in which the operating point of the transmission 4 moves over the shift map when the vehicle accelerates in a partial load state (here, throttle opening=4/8). FIG. 7 is a timing chart showing the manner in which the through speed ratio Ratio, the subtransmission mechanism speed ratio, the speed ratio vRatio of the variator 20, the primary rotation speed Npri, and the vehicle speed VSP vary during this acceleration.

When the driver depresses an accelerator pedal from a stationary state (vehicle speed VSP=0), the vehicle begins to accelerate. During startup, the transmission 4 is in the low speed mode, the speed ratio vRatio of the variator 20 is the Lowest speed ratio, and the gear position of the subtransmission mechanism 30 is the first speed.

During acceleration, the operating point of the transmission 4 moves along the shift lines set in advance on the shift map for each throttle opening TVO. In this example, the throttle opening TVO is set at 4/8, and therefore the operating point of the transmission 4 moves along the partial line, as shown by the thick arrow in FIG. 6.

When the operating point of the transmission 4 reaches a point X in FIG. 6 at a time t1, a shift to the small speed ratio side of the transmission 4 begins. This shift is performed by modifying the speed ratio vRatio of the variator 20 to the small speed ratio side.

When the operating point of the transmission 4 reaches the mode switch line at a time t2, or in other words when the through speed ratio Ratio of the transmission 4 reaches the mode switch speed ratio mRatio (a point Y in FIG. 6), mode switch control for switching the mode of the transmission 4 from the low speed mode to the high speed mode is begun.

The mode switch control is performed from the time t2 to a time t3. As shown in FIG. 7, in the mode switch control, the gear position of the subtransmission mechanism 30 is changed from the first speed to the second speed and the speed ratio vRatio of the variator 20 is modified to the large speed ratio side.

At the time t3, the mode switch control is completed and the gear position of the subtransmission mechanism 30 reaches the second speed. Subsequent shifts in the transmission 4 are performed by modifying the speed ratio vRatio of the variator 20 to the small speed ratio side.

Focusing on the speed ratio vRatio of the variator 20, at the time t2, the speed ratio vRatio of the variator 20 is the Highest speed ratio, and the torque input into the subtransmission mechanism 30 via the variator 20 is at a minimum under the torque input into the variator 20 at the time. In this embodiment, change of the gear position of the subtransmission mechanism 30 from the first speed to the second speed begins in this state, and therefore shift shock during a subtransmission mechanism 1-2 shift can be suppressed effectively.

It should be noted that in the above embodiment, the gear position of the subtransmission mechanism 30 is changed when the through speed ratio varies across the mode switch speed ratio mRatio, and therefore change of the gear position of the subtransmission mechanism 30 is not limited excessively. As a result, the favorable operating performance and fuel consumption performance that are obtained by providing the subtransmission mechanism 30 can be enjoyed.

Moreover, in the above embodiment, the speed ratio vRatio of the variator 20 is modified in the opposite direction to the variation direction of the speed ratio of the subtransmission mechanism 30 during the mode switch (time t2 to t3), and it is therefore possible to suppress not only shift shock in the subtransmission mechanism 30, but also an unpleasant feeling experienced by the driver due to input rotation variation generated by a sudden change in the through speed ratio Ratio.

An embodiment of this invention was described above, but the above embodiment merely illustrates one example of application of the invention, and the technical scope of the invention is not limited to the specific constitutions of the above embodiment.

For example, in the above embodiment, the subtransmission mechanism 30 is a transmission mechanism having two positions, i.e. the first speed and the second speed, as forward gear positions, but the subtransmission mechanism 30 may have three or more positions as forward gear positions. With this constitution, similar actions and effects to those of the above embodiment can be achieved by applying the invention to control for changing the gear position of the subtransmission mechanism between the first speed and second speed and control for changing the gear position between the second speed and third speed.

Further, the variator 20 may use a chain instead of a V belt 23. The variator 20 may be other types of continuously transmission, for example, toroidal type continuously transmission.

Further, the subtransmission mechanism 30 uses a Ravigneaux planetary gear mechanism, but the invention is not limited to this constitution. For example, the subtransmission mechanism 30 may be formed from a combination of a normal planetary gear mechanism and frictional engagement elements or from a plurality of power transmission paths constituted by a plurality of gear trains having different gear ratios and frictional engagement elements for switching the power transmission paths.

Furthermore, the hydraulic cylinders 23a, 23b are provided as actuators for displacing the movable conical plates of the pulleys 21, 22 in the axial direction, but the actuator is not limited to a hydraulically driven actuator, and may be driven electrically.

Further, the mode switch speed ratio is set at an equal value to the low speed mode Highest speed ratio, but here, the term "equal to" includes a case in which the mode switch speed ratio is substantially equal to the low speed mode Highest speed ratio, and such a case is included in the technical scope of the invention.

What is claimed is:

1. A continuously variable transmission installed in a vehicle comprising:
    a variator configured to modify a speed ratio continuously;
    a torque amplifying mechanism provided to a front of and in series with the variator and configured to amplify a torque input from an engine;
    a subtransmission mechanism provided to a rear of and in series with the variator and including, as forward gear positions, a first gear position and a second gear position having a smaller speed ratio than the first gear position, and
    a shift control unit configured to shift the subtransmission mechanism from the first gear position to the second gear position regardless of a vehicle speed when the speed ratio of the variator reaches a Highest speed ratio.

2. The continuously variable transmission as defined in claim 1, wherein:
    the shift control unit is further configured to keep the gear position of the subtransmission mechanism to the first gear position until the speed ratio of the variator reaches the Highest speed ratio.

3. The continuously variable transmission as defined in claim 1, wherein:

the torque amplifying mechanism is a torque converter.

4. The continuously variable transmission as defined in claim 1, wherein:
the torque amplifying mechanism is a gear train.

5. The continuously variable transmission as defined in claim 1, wherein:
the torque amplifying mechanism is a combination of a torque converter and a gear train.

6. A continuously variable transmission installed in a vehicle comprising:
a variator configured to modify a speed ratio continuously;
a torque amplifying mechanism provided to a front of and in series with the variator and configured to amplify a torque input from an engine;
a subtransmission mechanism provided to a rear of and in series with the variator and including, as forward gear positions, a first gear position and a second gear position having a smaller speed ratio than the first gear position, and
a shift control unit configured to shift the subtransmission mechanism from the first gear position to the second gear position regardless of a throttle opening of an engine when the speed ratio of the variator reaches a Highest speed ratio.

7. The continuously variable transmission as defined in claim 6, wherein:
the shift control unit is further configured to keep the gear position of the subtransmission mechanism to the first gear position until the speed ratio of the variator reaches the Highest speed ratio.

8. The continuously variable transmission as defined in claim 6, wherein:
the torque amplifying mechanism is a torque converter.

9. The continuously variable transmission as defined in claim 6, wherein:
the torque amplifying mechanism is a gear train.

10. The continuously variable transmission as defined in claim 6, wherein:
the torque amplifying mechanism is a combination of a torque converter and a gear train.

11. A continuously variable transmission installed in a vehicle comprising:
a variator configured to modify a speed ratio continuously;
a torque amplifying mechanism provided to a front of and in series with the variator and configured to amplify a torque input from an engine;
a subtransmission mechanism provided to a rear of and in series with the variator and including, as forward gear positions, a first gear position and a second gear position having a smaller speed ratio than the first gear position, and
a shift control unit configured to shift the subtransmission mechanism from the first gear position to the second gear position regardless of a vehicle speed and a throttle opening of an engine when the speed ratio of the variator reaches a Highest speed ratio.

12. The continuously variable transmission as defined in claim 11, wherein:
the shift control unit is further configured to keep the gear position of the subtransmission mechanism to the first gear position until the speed ratio of the variator reaches the Highest speed ratio.

13. The continuously variable transmission as defined in claim 11, wherein:
the torque amplifying mechanism is a torque converter.

14. The continuously variable transmission as defined in claim 11, wherein:
the torque amplifying mechanism is a gear train.

15. The continuously variable transmission as defined in claim 11, wherein:
the torque amplifying mechanism is a combination of a torque converter and a gear train.

* * * * *